P. E. & J. P. Gruger,
Washstand,
No. 86,222.  Patented Jan. 26, 1869.
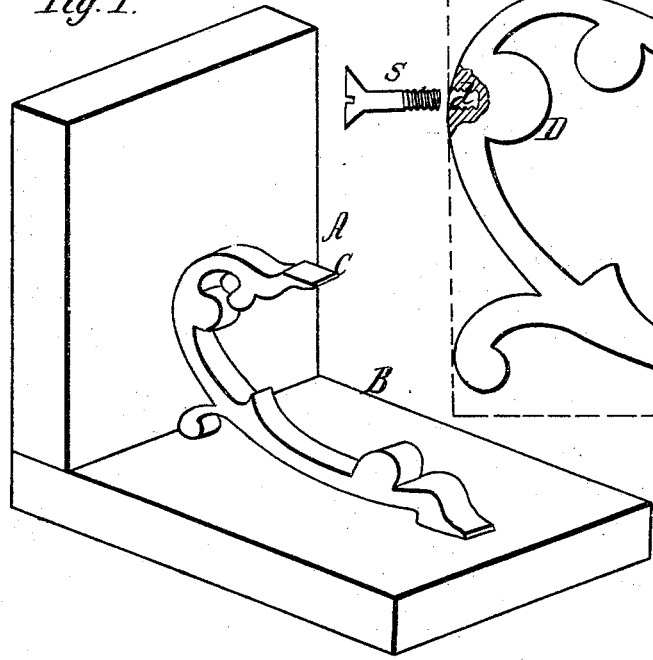
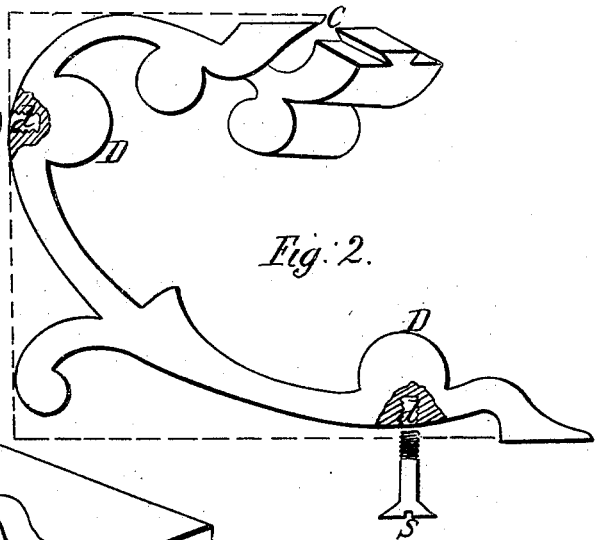
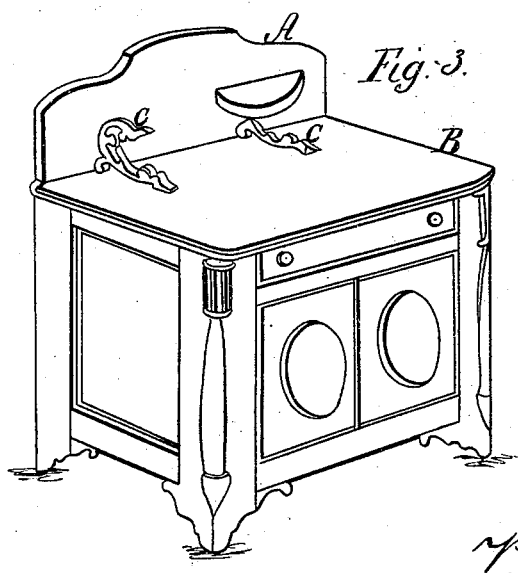
Witnesses:
Wm. B. Wiley
Jacob Stauffer
Inventors:
P. E. Gruger
J. P. Gruger

United States Patent Office.

PEARSON E. GRUGER AND JOHN P. GRUGER, OF LANCASTER, PENNSYLVANIA.

Letters Patent No. 86,222, dated January 26, 1869.

IMPROVED MARBLE TOP WASH-STAND.

The Schedule referred to in these Letters Patent and making part of the same.

*To all whom it may concern:*

Be it known that we, PEARSON E. GRUGER and JOHN P. GRUGER, of the city of Lancaster, in the State of Pennsylvania, have made a new and useful Improvement on Wash-Stands provided with Marble Tops, in the manner of securing the marble slabs by means of metallic brackets; and do hereby declare that the following is a full and exact description of the same, reference being had to the accompanying drawings, making a part of this specification, in which—

Figure 1 is a perspective view of the application of the bracket C to the top slabs A B of marble on wash-stands.

Figure 2 is an enlarged view of the gilt or silver-plated bracket, with sockets, $d$, for a screw-thread, in the bosses D, showing the screws S detached, which are passed through perforations in the marble, and made to enter the screw-sockets in the brackets. There is also a tracing of a dovetail top on the bracket, for sliding on a shelf.

Figure 3 is a perspective view of an ordinary wash-stand, with our improvement in place.

The nature of our improvement consists in having a screw-thread cut in hard metal, such as iron, brass, or copper, and so as to constitute a bracket to support a shelf, as well as to make a more permanent union of the slabs of marble than ever before accomplished in articles of furniture of the kind.

What has already been said and shown will enable any one skilled in the art to make and use our improvement.

The mode, in universal use, of securing pieces of marble by casting lead or soft metal around the headed bolts that unite them, experience has proved to be highly objectionable. A slight jar or blow causes such joining to become loose and yielding, and the annoyance from this cause has been long felt in the use of marble brackets.

To obviate these serious objections, and to provide a neat and ornamental bracket, instead of marble, we have brackets cast expressly for the purpose, of iron, copper, or brass, of any desired pattern, either plain, gilt, or silver-plated, by which we are enabled to secure the vertical slab A firmly to the top, B, with more ease, at less cost, and equally beautiful, if not more desirable, and far superior in strength and durability to any heretofore in use.

We are aware that we cannot claim a bracket, for such are common; nor do we broadly claim metallic brackets for joining marble slabs at right angles, in the manner we use them. But we deem their application to wash-stands both novel and useful, and a desirable improvement on marble-topped wash-stands. Therefore,

What we claim as our improvement, and desire to secure by Letters Patent, is—

Securing the horizontal and vertical marble slabs A and B of a wash-stand together, by brackets $c$, by passing screws $s$ through holes in the slabs into screw-threads $d$ of the brackets, for the purpose specified.

P. E. GRUGER.
J. P. GRUGER.

Witnesses:
WM. B. WILEY,
J. STAUFFER